United States Patent [19]

Green

[11] Patent Number: 4,682,492

[45] Date of Patent: Jul. 28, 1987

[54] MEANS AND METHOD FOR DETECTING LEAKS IN TANKS

[76] Inventor: Marion C. Green, 1999 Amidon, Suite 208, Wichita, Kans. 67203

[21] Appl. No.: 752,841

[22] Filed: Jul. 8, 1985

[51] Int. Cl.⁴ ............................................. G01M 3/04
[52] U.S. Cl. ................................. 73/49.2; 73/40.5 R; 405/54
[58] Field of Search ...................... 73/40.5 R, 40, 49.2; 405/53, 54, 55

[56] References Cited

U.S. PATENT DOCUMENTS

| | | | |
|---|---|---|---|
| 2,924,352 | 2/1960 | Santner et al. | 73/49.2 |
| 3,252,155 | 5/1966 | Surtees et al. | 73/40.5 R |
| 3,504,496 | 4/1970 | Hnot | 405/53 |
| 3,505,820 | 4/1970 | Draper et al. | 73/40 |
| 3,736,754 | 6/1973 | Azalbert et al. | 405/53 |
| 3,940,940 | 3/1976 | Barrett | 405/54 |
| 3,943,721 | 3/1976 | Azalbert et al. | 405/53 |
| 4,335,978 | 6/1982 | Mutch | 405/54 |
| 4,352,601 | 10/1982 | Valiga et al. | 405/54 |
| 4,430,021 | 2/1984 | Wagner et al. | 405/129 |
| 4,439,062 | 3/1984 | Kingsbury | 405/54 |
| 4,464,081 | 8/1984 | Hillier et al. | 405/54 |
| 4,543,013 | 9/1985 | Wagner et al. | 405/53 |

Primary Examiner—Stewart J. Levy
Assistant Examiner—Hezron E. Williams
Attorney, Agent, or Firm—John W. Carpenter

[57] ABSTRACT

A system for detecting leaks in a tank, or the like, comprising an excavation basin including a periphery and defining a generally saucer-like formation with a basin surface which slopes from the periphey. A tank supported by the excavation basin. The tank has a permeation barrier extending from the periphery of the basin excavation and is supported by and conforms to the basin surface of the saucer-like formation. A corrosion curtain is integrally bound to said permeation barrier and defines an upright side wall of the tank. Particulate matter is supported by the permeation barrier, and a liquid-impervious liner continuously extends from the top of and down the corrosion curtain upright side wall and across the top of the particulate matter that is being supported by the permeation barrier. A liquid leakage receiver is positioned in the particulate matter. A monitor conduit is bound to the leakage receiver and pierces the permeation barrier and extends under the excavation basin outwardly therefrom beyond the periphery of the excavation basin. A leak-check tube is attached to the monitor conduit under the ground and projects upwardly therefrom beyond the surface of the ground. A method for detecting leaks in a tank comprising the steps of:

(a) dispersing particulate matter along the surface of the permeation barrier; (b) positioning the liquid leakage receiver in the particulate matter; (c) binding integrally the monitor conduit to the leakage receiver such that the monitor conduit pierces the permeation barrier and extends outwardly therefrom beyond the periphery of the excavation basin; (d) lining continuously the upright side wall and the top of the particulate matter with the liquid-impervious liner; and (e) detecting any leakage from the tank through a leak-check tube that is bound to and in communication with the monitor conduit.

20 Claims, 8 Drawing Figures

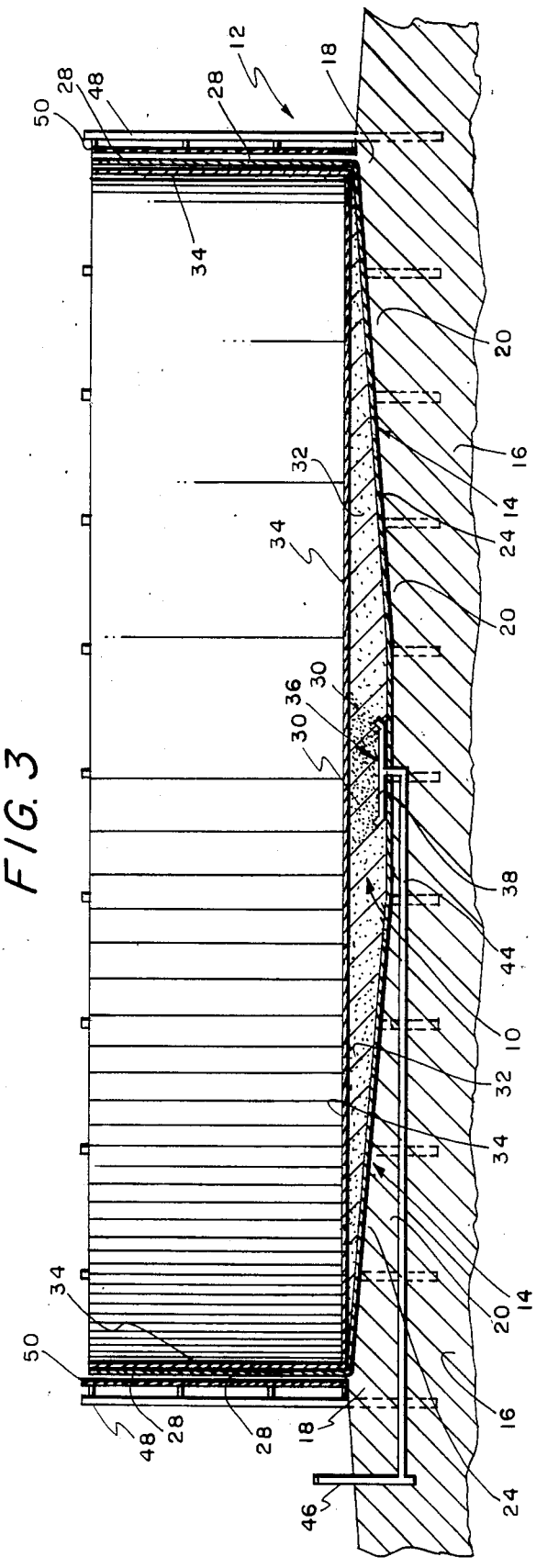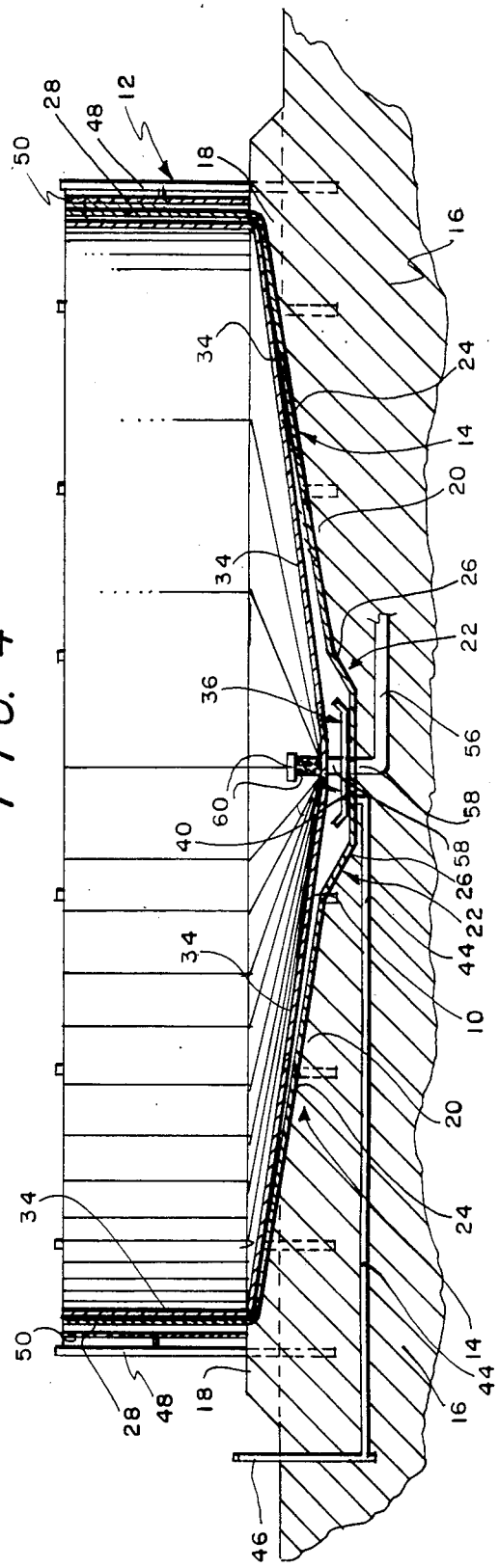

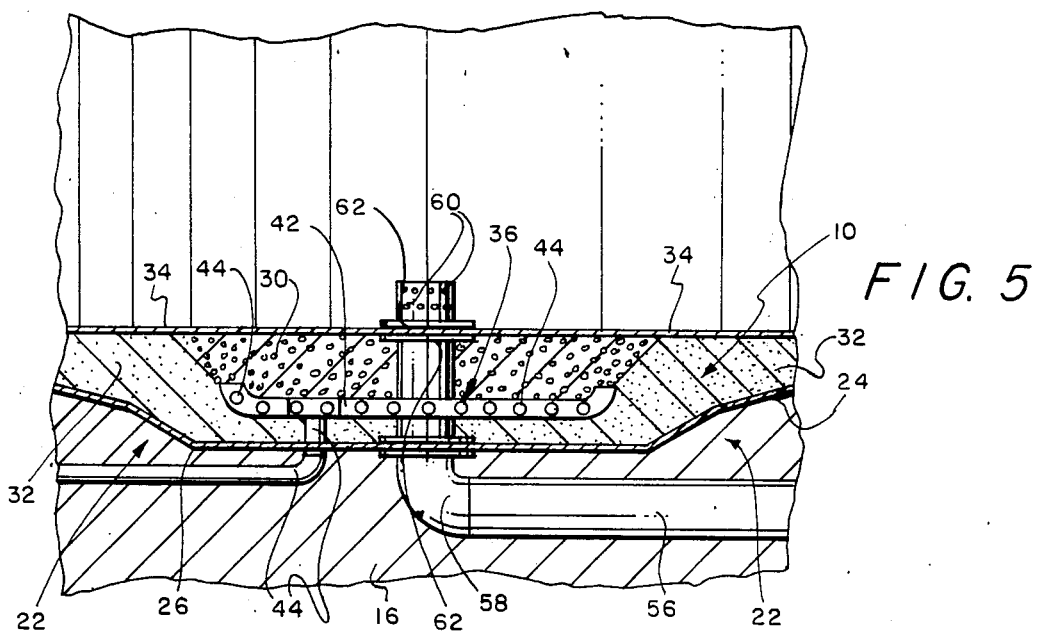
FIG. 5
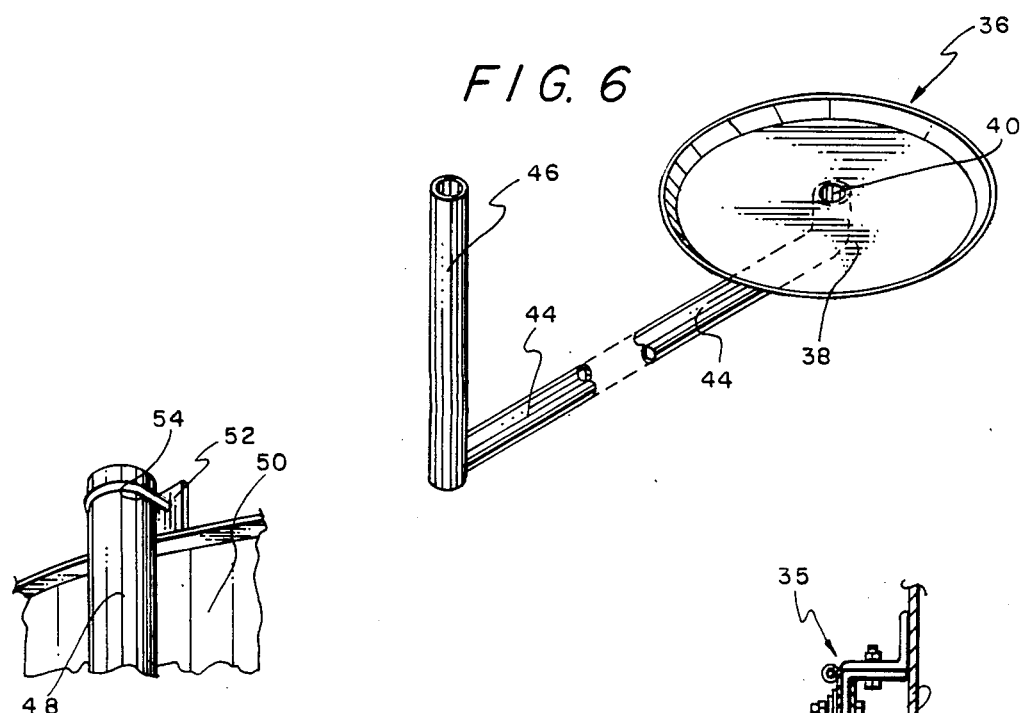
FIG. 6
FIG. 7
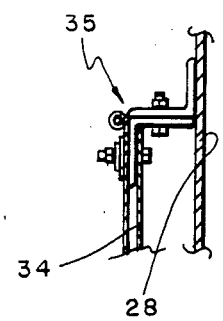
FIG. 8

MEANS AND METHOD FOR DETECTING LEAKS IN TANKS

BACKGROUND OF THE INVENTION

1. Field of the Invention

This invention is related to a means and a method for detecting leaks in a tank, or the like. More specifically, this invention is related to a system and a method for detecting leaks in a tank that is supported by an excavation basin means.

2. Background of the Invention

U.S. Pat. Nos. 3,736,754 and 3,943,721 by Azalbert et al teaches a storage facility including a reservoir for the liquids in the form of a lined pit. U.S. Pat. No. 3,940,940 by Barrett discloses a protection method for petroleum storage wherein the petroleum may be stored in a tank disposed in a lined pit. The lined pit has a liner or membrane on which a layer of resin is applied. Any oil leaking from the tank is prevented from entering the ground by means of the impervious membrane. U.S. Pat. No. 4,352,601 by Valiga et al illustrates a bin for storing hazardous materials wherein the bin has a bottom layer of impermeable cementitious material and below this an impervious film, such as plastic or the like, to prevent any leakage from the storage bin. U.S. Pat. No. 3,505,820 by Draper et al discloses a reservoir lined with a plastic material. In the event of leakage, the leaking material may collect in the bottom of a pit having a pipe extending upwardly to the surface adjacent the storage reservoir. A sampling container may be inserted through the pipe to the bottom of the pit to collect any material therein which is indicative of a leak in the liner. None of the foregoing prior art teach or suggest the particular system and method for detecting leaks in a tank of this invention.

SUMMARY OF THE INVENTION

This invention broadly accomplishes its desired objects by providing a system for detecting leaks in a tank means, or the like.

The system includes an excavation basin means having a periphery and defining a generally saucer-like formation with a basin surface which slopes from the periphery. A tank means is supported by the excavation basin means. The tank means has a permeation barrier means extending from the periphery of the basin excavation means and is supported by and conforms to the basin surface of the saucer-like formation. A corrosion curtain means is integrally bound to the permeation barrier means and defines an upright side wall of the tank means. Particulate matter is supported by the permeation barrier means. A liquid-impervious liner means continuously extends from the top of and down the permeation barrier upright side wall and across the top of the particulate matter that is being supported by the permeation barrier means. A liquid leakage receiver means is positioned in the particulate matter. A monitor conduit means is bound to receiver means, pierces the barrier means, and extends under the excavation basin means outwardly therefrom beyond the pheriphery of the excavation basin. A leak-check tube means is attached to the monitor conduit means under the ground and projects upwardly therefrom beyond the surface of the ground. This invention further accomplishes its desired objects by providing a method for detecting leaks in a tank means, or the like, which has a permeation barrier means conforming to the surface of a basin excavation means having a periphery and a corrosion curtain means integrally bound to the permeation barrier means to define an upright side wall of the tank means. The method comprises the steps of:

(a) dispersing particulate matter along the surface of the permeation barrier means;

(b) positioning a liquid leakage receiver means in the particulate matter;

(c) binding integrally a monitor conduit means to the receiver means of step (b) such that the monitor conduit means pierces the permeation barrier means and extends outwardly therefrom beyond the periphery of the excavation basin means;

(d) lining continuously the corrosion curtain upright side wall and the top of the particulate matter with a liquid-impervious liner means; and (e) detecting any leakage from the tank means through a leak-check tube means that is bound to and in communication with the monitor conduit means.

It is therefore an object of this invention to provide a method and a system for detecting leaks in a tank, or the like.

It is another object of this invention to provide a system and method for detecting leaks in a tank in order to prevent polution, contamination, and waste.

Still further objects of the invention reside in a provision of a system for detecting leaks in a tank which is relative inexpensive to manufacture and install.

These together with the various ancillary objects and features will become apparent as the following description proceeds, are attained by this invention, preferred embodiments being shown in the accompanying drawings, by way of example only, wherein:

BRIEF DESCRIPTION OF THE DRAWINGS

FIG. 3 is a vertical sectional view taking in direction of the arrows and along the plane of line 3—3 in FIG. 2;

FIG. 4 is a vertical sectional view of another embodiment of the system for detecting leaks in tank;

FIG. 5 is a partial enlarged vertical sectional view of the leak detection system for the embodiment of the invention having a sump;

FIG. 6 is a perspective view of the plate and the monitor conduit attached thereto which is also represented in the embodiment of the invention of FIG. 3;

FIG. 7 is a partial perspective view of a top of a support stay post having a protective side wall secured thereto with a bracket; and FIG. 8 is a partial vertical sectional view disclosing a bracket assembly for securing a liquid-impervious liner up and against the corrosion curtain upright side wall.

DETAILED DESCRIPTION OF THE DRAWINGS

Figure 1:
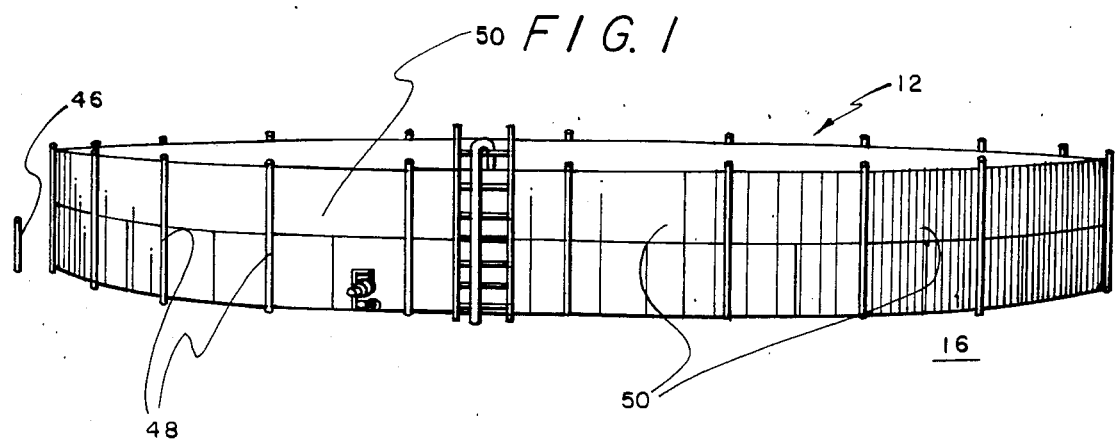
FIG. 1 is a perspective view of a tank.

With continuing reference to the drawings for the detailed description of the invention and wherein similar parts of the invention are identified by like reference numerals, there is seen a system generally illustrated as 10, for detecting leaks in a tank, generally illustrated as 12.

The system 10 has two preferred embodiments. One preferred embodiment is illustrated in FIG. 3 and has a flat bottom, and another preferred embodiment is illustrated in FIG. 4 and has a conical bottom.

In the two preferred embodiments of the system 10, there is an excavation basin 14 in the ground 16 which supports the tank 12. The basin 14 has a periphery 18, which in the embodiment of FIG. 4 is raised or elevated, and defines a generally saucer-like formation with a basin surface 20 which slopes from the periphery 18 downwardly through the middle of the basin 14. In the preferred embodiment of the system 10 in FIG. 4, basin 14 has a basin sump, generally illustrated as 22.

The tank 12 has a permeation barrier 24 extending from the periphery 18 of the basin 14 to cover the entire surface 20 of the basin 14. Permeation barrier 24 is supported by the basin surface 20 and conforms to the basin surface 20 of the saucer-like formation. In the preferred embodiment of the system 10 in FIG. 4, the permeation barrier 24 has a barrier sump 26 that is supported by and conforms to the basin sump 22. A corrosion curtain 28 is integrally bound to the permeation barrier 24 in proximity to the periphery 18 in order to define an upright side wall of the tank 12.

Particulate matter 30 and particulate matter 32 are supported by the permeation barrier 24. Particulate matter 30 has particles of particulate size larger than the particulate matter 32 in order for the particulate matter 32 to may have a lower permeability than matter 30. A liquid-impervious liner 34 continuously extends from the top of the corrosion curtain 28, down the upright side wall which the corrosion curtain 28 defines, and across the top of the particulate matters 30 and 32 that are being supported by the permeation barrier 24. The liquid-impervious liner 34 is preferably anchored or secured to the top of the corrosion curtain 28 by the bracket assembly 35 of FIG. 8.

A liquid leakage receiver, generally illustrated as 36, is positioned in the particulate matters 30 and 32. In the preferred embodiment for the system 10 in FIG. 3, receiver 36 is a plate 38 (see FIG. 6) with an aperture 40. In the preferred embodiment for the system 10 in FIG. 4, receiver 36 is a monitor pipe 42 having a structure defining a plurality of apertures 43 (see FIGS. 4 and 5). In both preferred embodiments of the invention, a portion of the particulate matter 32 is additionally positioned below the receiver 36, whether it be the monitor pipe 42 (see FIG. 5) or the plate 38 (see FIG. 3). Similarly, as illustrated in FIGS. 3 and 5, a portion of the particulate matter 30 is positioned above the receiver 36, no matter what embodiment the receiver 36 possesses.

A monitor conduit 44 is bound to both embodiments of the receiver 36 (i.e. the plate 38 or the pipe 42) and pierces the permeation barrier 24 (as illustated in FIGS. 3 4 and 5) and extends in the ground 16 under the excavation basin 14 outwardly therefrom beyond the periphery 18 of the excavation basin 14. In the embodiment for the receiver 36 illustrated in FIGS. 3 and 6, the monitor conduit 44 supports the plate 38 such that the aperture 40 of plate 38 is in communication with the inside of the monitor conduit 44.

Figure 2:
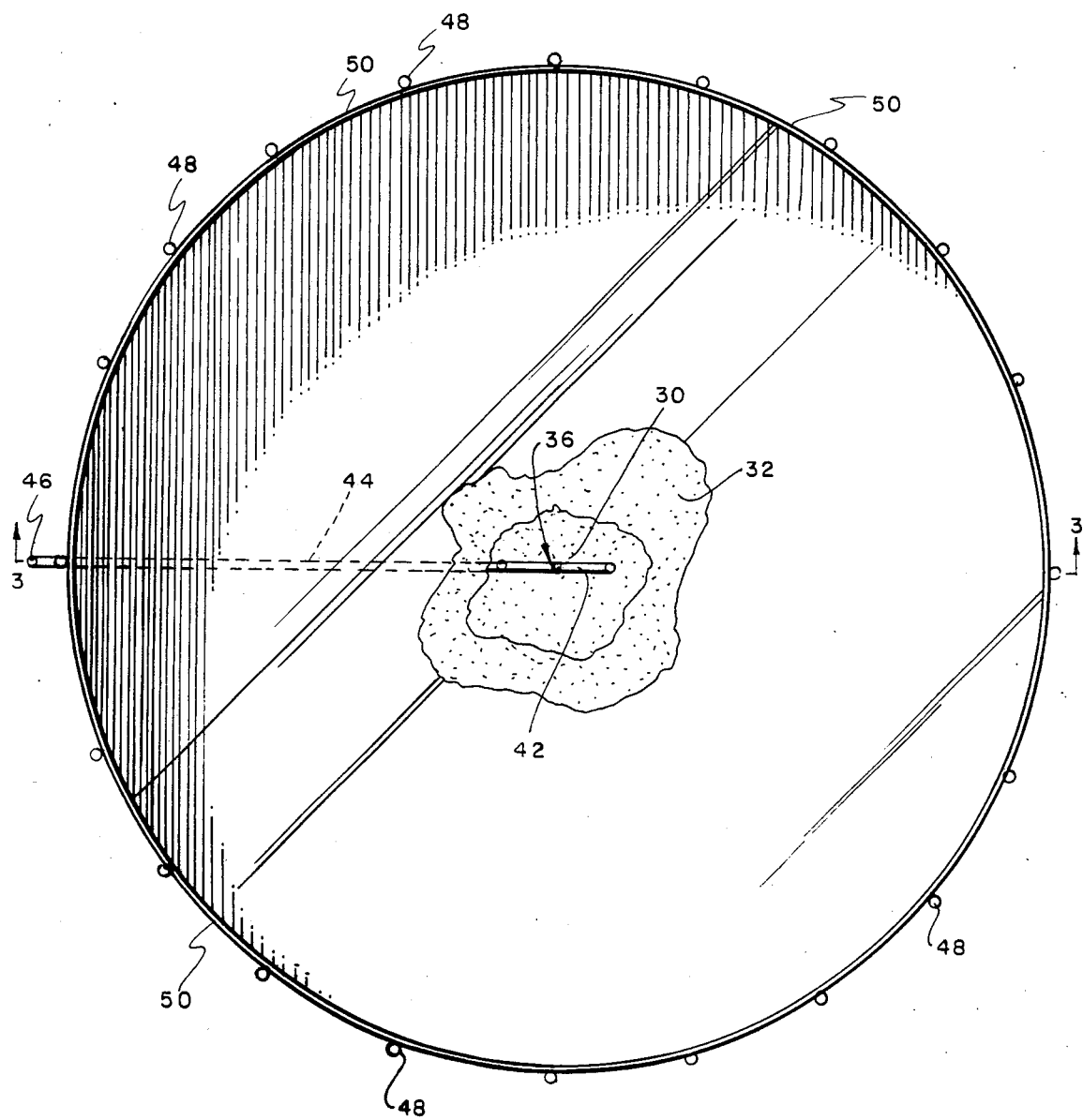
FIG. 2 is a bottom plan view of the tank of FIG. 1.

A leak-check tube 46 is attached integrally to the monitor conduit 44 under the ground 16 and projects upwardly from the surface thereof as illustrated in FIGS. 1, 2, 3, 4 and 6. The leak-check tube 46 enables a person to look down (or sound) in order to detect for any fluid leakage from the tank 12.

In a preferred embodiment of the invention, a plurality of stay post 48 peripherally surround the excavation basin 14 and are implanted in the ground 16 therearound in proximity to the periphery. A protective side wall 50 is secured to the plurality of stay post 48 and circumferentially surrounds the corrosion curtain 28 side wall. The combination of the stay posts 48 and the protective side wall 50 gives added protection to the surrounding environment in preventing leakage from the tank 12, and protects the surrounding area in the event of a burst in the liner 34 and the corrosion curtain 28. The side wall 50 is protected from corrosion by the liner 34 and the curtain 28. The stay posts 48 are implanted in a concrete embodiment, and may be manufactured of any strong material, but is preferably steel. Side wall 50 may likewise be manufactured of any strong material, but is preferably galvanized steel. Side wall 50 is preferably secured to the stay posts 48 through a kicker plate 52-U bolt 54 assembly of FIG. 7.

In the preferred embodiment of the invention 10 illustrated in FIGS. 4 and 5, the system 10 additionally comprises a tank underdrain conduit 56 having a conduit end 58 bound thereto and extending through the barrier sump 26 of the permeation barrier 24, through the particulate matters 30 and 32, and through the liquid-impervious liner 34. The section of the riser conduit end 58 extending beyond the liquid-impervious liner 34 has a structure defining a plurality of riser apertures 60. A pair of flanges 62—62 (see FIG. 5) circumferentially surrounds the rising conduit end 58 while being bound thereto, and sandwiches the liquid-impervious liner 34 such as to form a liquid-tight seal around the liquid-impervious liner 34.

The permeation barrier 24 may be manufactured of any impervious material which is strong enough for its function and non-corrosive to the elements. Suitable materials for the permeation barrier 24 include, but are not limited to, galvanized steel and certain plastics. Likewise, the corrosion curtain 28 may also be manufactured of any impervious material which is strong enough for its function, which includes withstanding fluid pressure from within the tank 12, and is also non-corrosive to the elements. Suitable materials for the corrosion curtain 28 also include, but are not limited to, galvanized steel and certain plastics. The type of material that the barrier 24 and the curtain 28 is manufactured of is not critical as long as it performs its functions which are well-known to those in the art.

The liquid-impervious liner 34 may be manufactured of any impervious material which is impervious, strong and resistant enough to withstand any of the forces which any liquid within the tank 12 may impose upon it. In a preferred embodiment of the invention, the liquid-impervious liner 34 is manufactured of a malleable, flexible impervious material. In a more preferred embodiment or the invention, the liquid-impervious liner 34 is manufactured or constructed of an impervious plastic means selected from the group consisting of, but not limited to, high density polyethylene, polypropylene, polyvinyl fluoride, polyvinyl chloride, polyurethane, and polyethylene terephthalate.

The particulate matters 30 and 32 are in a preferred embodiment of the invention gravel and sand, respectively. However, it is to be understood that the particulate matters 30 and 32 may be any particulate matters which are capable of functioning as a migration pad in the event that there is a liquid leakage from the tank 12 through the liquid-impervious liner 34. A migration pad enables any fluids that leak from the tank 12, especially in proximity to the periphery 18 and the corrosion curtain 28 upright side wall, to flow by gravity downwardly from the leakage point through the particulate matter 32, through the particulate matter 30 and into one of the embodiments of the liquid-leakage receivers 36, without preferably flowing underneath one of the receivers 36 or the particulate matter 32 positioned underneath one of the receivers 36. Fluid that leaks from the tank 12 and flows into the particulate matter 32 underneath one of the liquid-leakage receivers will not be detected in the leak-check tube 46.

It is important that the permeability of particulate matter 32 be low enough such that any leakage will have the opportunity of flowing into the particulate matter 30 before flowing onto the top surface of the permeation barrier 24. One of the features of the preferred embodiment of FIGS. 4 and 5 which include the basin sump 22 and the barrier sump 26, which is supported by and conforms to the basin sump 22, is that any fluid leakage is offered an additional opportunity of flowing into particulate matter 30 from particulate matter 32 and into the liquid-leakage receiver 36, before only flowing through the particulate matter 32 to underneath the liquid-leakage receiver 36. In the embodiment of the invention in FIG. 5, the particulate matter 30 is seated in the barrier sump 26, and the particulate matter 32 is additionally positioned in the barrier sump 26 and below the liquid-leakage receiver 36.

As was previously mentioned, particulate matter 30 is preferably gravel. Gravel may include a material mixture of sand, flints and loam each of which preferably includes a particle size having between about 1 mm in diameter or its greatest measurement extremity (e.g. length, circumference, etc.) and about 100 mm in diameter or its greatest measurement extremity.

As was also previously mentioned, particulate matter 32 is preferably sand which may be generally defined to include loose, unconsolidated detrital sedement, consisting essentially of rounded grains of quartz. Sand in sedement petrology is generally restricted to sedements whose grains lie between about 0.1 mm in diameter and about 1 mm in diameter. In the preferred embodiment of the invention, particulate matter 32 is sand having a particle size of between about 0.05 mm in diameter and about 2 mm in diameter: most preferably, the particle size of the sand is the sedementary petrology size, i.e. one having a particle size of between about 0.1 mm in diameter and about 1 mm in diameter.

With continuing reference to the drawings for operation of the invention and the method for detecting leaks in a tank 12, the particulate matters 30 and 32 are dispersed along the top surface of the permeation barrier 24, including the barrier sump 26 for the preferred embodiment of FIGS. 4 and 5. Depending on the preferred embodiment of the system 10, one of the embodiments of the liquid-leakage receiver 36 is positioned in (or between) the particulate matters 30 and 32, as illustrated in FIGS. 3, 4 and 5. The monitor conduit 44 has been bound to one of the embodiments of the liquid-leakage receiver 36 such that the monitor conduit 44 pierces the permeation barrier 24 for the preferred embodiment of FIG. 3, or the barrier sump 26 for the preferred embodiment of FIGS. 4 and 5. In either embodiment, the monitor conduit 44 is to extend outwardly in the ground 16 from the excavation basin 14 until it is beyond the periphery 18 of the basin 14. The liquid-impervious liner 34 is attached to the top of the corrosion curtain 28 in accordance with bracket assembly 35 of FIG. 8, and extends down the upright side wall of the corrosion curtain 34 to line the same and cover the top of the particulate matters 30 and 32.

Leak-check tube 46 is connected to an end of the monitor pipe 44 and protrudes upwardly from the surface of the ground in order for any person to detect any leakage from the tank 12.

The leak-check tube 46 is in communication with the inside of the monitor conduit 44 and any fluids that leak from the tank 12 through the liquid-impervious liner 34 and into the particulate matter 30, eventually gravity flows into one of the liquid-leakage receivers 36 wherein it is dispersed into the monitor conduit 44 for detection through the leak-check tube 46. Any fluids that leak from the tank 12 through the liquid-impervious liner 34 and into the particulate matter 32, flow by gravity through the particulate matter 32 and into the particulate matter 30, and further into one of the liquid-leakage receivers 36 wherein again it is dispersed into the monitor conduit 44 either through aperture 40 of plate 38 or apertures 44 of the conduit pipe 42, for detection with the leak-check tube 46.

In the preferred embodiment of FIGS. 4 and 5, the tank underdrain conduit 56 is laid underneath the excavation basin 14. The riser conduit end 58 has been connected to the tank underdrain conduit 56 and extends through the barrier sump 26 of the permeation barrier 24, through the particulate matters 30 and 32, and through the liquid-impervious liner 34. The flanges 62—62, that are bound to the riser conduit end 58, sandwich the liquid-impervious liner 34 in order to prevent leakage in this connection area. The section of the riser conduit end 58 that extends beyond the liquid-impervious liner 34 has a structure defining the plurality of riser apertures 60. The tank underdrain conduit 56 enables one to drain any fluid from within the tank 12 through the riser apertures 60 by merely opening a valve (not shown in the drawings).

Thus by the practice of this invention there is provided a positive prevention of pollution, contamination and wastes. This invention further prevents percolation in all types of seals, from clay to sand. The design of this invention includes the migration sand pad (of particulate matters 30 and 32) between the liquid impervious liner 34 and the permeation barrier 24 to permit easy and unrestricted flow of any fluids to one of the embodiments of the liquid-leakage receiver 36. The design of this invention also includes a general permeation barrier to all areas of the fluid impounded, including the upright side walls defined by the corrosion curtain 28. The corrosion curtain 28 prevents any corrosion to the side walls 50 while simultaneously assists in conducting any leaked fluid to the liquid-leakage receiver 36. The permeation barrier 24 also assists in conducting any leaked fluid to the liquid-leakage receiver 36 while simultaneously defining a liner for the excavation basin 14.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. A system for detecting leaks in a tank means, or the like, comprising an excavation basin means in a ground having a surface and including a periphery and defining a generally saucer-like formation with a basin surface which slopes from said periphery;

a tank means supported by said excavation basin means, said tank means having a permeation barrier means extending from the periphery of the basin excavation and supported by and conforming to the basin surface of the saucer-like formation, an impervious corrosion curtain means integrally bound to said permeation barrier means at the periphery of the basin and defining an upright side wall of the tank means, particulate matter means supported by said permeation barrier means, a liquid-impervious liner means continuously extending from the top of and down said corrosion curtain up-right side wall and across the top of the particulate material that is being supported by the permeation barrier means;

a liquid-leakage receiver means positioned in said particulate matter;

a monitor conduit means bound to said receiver means and piercing the barrier means and extending under the excavation basin means outwardly therefrom beyond the periphery of said excavation basin;

and a leak-check tube means attached to said monitor conduit means under the ground and projected upwardly therefrom beyond the surface of the ground.

2. The system of claim 1 additionally comprising a tank underdrain conduit means including a riser conduit end means extending through said permeation barrier means, through said particulate matter, and through said liquid-impervious liner means, said section of said riser conduit end means extending beyond the liquid-impervious liner means having a structure defining a plurality of riser apertures;

a pair of flanges circumferentially surrounding said riser conduit end means and sandwiching said liquid-impervious liner means such as to form a liquid-tight seal around said liquid-impervious liner means.

3. The system of claim 1 wherein said liquid leakage receiver means comprises a monitor pipe means having a structure defining a plurality of apertures.

4. The system of claim 1 wherein said leakage receiver means comprises a plate means with a plate aperture, said monitor conduit means supporting said plate means such that said plate aperture is in communication with the inside of said monitor conduit means.

5. The system of claim 1 wherein said excavation basin means additionally comprises a basin sump at the bottom of said basin surface, and said permeation barrier means additionally comprises a barrier sump supported by and conforming to the basin sump.

6. The system of claim 1 wherein said particulate matter means comprises a first particulate matter and a second particulate matter, said first particulate matter having particles of larger particulate size than said second particulate matter.

7. The system of claim 6 wherein said liquid leakage receiver means supports a portion of said first particulate matter, and said second particulate matter is additionally positioned below said receiver means.

8. The system of claim 1 additionally comprising a plurality of stay post means peripherally surrounding said excavation basin means and implanted in the ground therearound;

a protective side wall means secured to said plurality of stay post means and circumferentially surrounding said corrosion curtain upright side wall.

9. The system of claim 1 wherein said liquid-impervious liner means comprises impervious plastic selected from the group consisting of high-density polyethylene, polypropylene, polyvinyl fluoride, polyvinyl chloride, polyurethane, and polyethylene terephthalate.

10. The system of claim 6 wherein said first particulate matter comprises a gravel means and said second particulate matter comprises sand means.

11. The system of claim 6 wherein said first particulate matter is situated in said barrier sump, and said second particulate matter is additionally positioned in said barrier sump below said receiver means.

12. The system of claim 1 wherein said excavation basin means includes an elevated periphery.

13. The system of claim 10 wherein said sand means comprises loose, unconsolidated accumulations of detrital sediment having a particle size of between about 0.05 mm in diameter and about 2 mm in diameter.

14. The system of claim 10 wherein said gravel means incudes a material mixture of sand, flints and loam, each of which comprises a particle size having between about 1 mm in diameter and about 100 mm in diameter.

15. A method for detecting leaks in a tank means, or the like, having a permeation barrier means conforming to the surface of a basin excavation means having a periphery and an impervious corrosion curtain means integrally bound to the permeation barrier means at the periphery of the basin to define an upright side wall of the tank means, said method comprising the steps of:

(a) dispersing particulate matter along the surface of said permeation barrier means;

(b) positioning a liquid leakage receiver means in said particulate matter;

(c) binding integrally a monitor conduit means to said receiver means of step (b) such that said monitor conduit means pierces the permeation barrier means and extends outwardly therefrom beyond the periphery of the excavation basin means;

(d) lining continuously the corrosion curtain upright side wall and the top of the particulate matter with a liquid-impervious liner means; and (e) detecting any leakage from the tank means through a leak-check tube means that is bound to and in communication with the monitor conduit means.

16. The method of claim 15 wherein said particulate matter of said dispersing step (a) comprises a first particulate matter and a second particulate matter, said first particulate matter having particles of larger particulate size and a higher permeability than said second particulate matter, and said first particulate matter is dispersed above said liquid leakage receiver means in order to be supported by the same;

and said second particulate matter is additionally positioned below said receiver means.

17. The method of claim 15 additionally comprising extending through said permeation barrier means, through said particulate matter, and through said liquid-impervious liner means a riser conduit end means of a tank underdrain conduit means, said section of said riser conduit end means extending beyond the liquid-impervious liner having a structure defining a plurality of riser apertures.

18. The method of claim 17 additionally comprising sandwiching said liquid-impervious liner means between a pair of flanges that are bound circumferentially to said riser conduit end means.

19. The method of claim 16 wherein said excavation basin means defines a generally saucer-like formation with a basin surface which slopes downwardly from said periphery such that any fliuds that leak from said tank means in proximity to the corrosion curtain upright side wall and the periphery of the excavation basin means flow by gravity through the second particulate matter through the first particulate matter and into the liquid leakage receiver means wherein it is dispersed into the monitor conduit means for detection.

20. The method of claim 19 wherein said excavation basin means additionally comprises a basin sump at the bottom of said basin surface, and said permeation barrier means additionally comprises a barrier sump supported by and conforming to the basin sump.

* * * * *